US012799901B2

(12) United States Patent
Cao et al.

(10) Patent No.: US 12,799,901 B2
(45) Date of Patent: Nov. 17, 2026

(54) ENGINE BRAKE CAPSULE WITH PLUNGER PAD

(71) Applicant: Eaton Intelligent Power Limited, Dublin (IE)

(72) Inventors: Jian Cao, Shanghai City (CN); Jianhua Lin, Shanghai (CN); Weian Zheng, Shanghai (CN)

(73) Assignee: Eaton Intelligent Power Limited, Dublin (IE)

(*) Notice: Subject to any disclaimer, the term of this patent is extended or adjusted under 35 U.S.C. 154(b) by 0 days.

(21) Appl. No.: 19/244,729

(22) Filed: Jun. 20, 2025

(65) Prior Publication Data

US 2025/0314209 A1 Oct. 9, 2025

Related U.S. Application Data

(63) Continuation of application No. PCT/EP2024/025023, filed on Jan. 12, 2024.

(Continued)

(51) Int. Cl.

*F02D 13/06* (2006.01)

*F01L 1/18* (2006.01)

(Continued)

(52) U.S. Cl.

CPC ................ *F02D 13/06* (2013.01); *F01L 1/18* (2013.01); *F01L 13/0005* (2013.01); *F01L 13/065* (2013.01)

(58) Field of Classification Search

CPC ..... F02D 13/06; F01L 1/18; F01L 1/26; F01L 13/0005; F01L 2013/001; F01L 13/06; F01L 13/065

See application file for complete search history.

(56) References Cited

U.S. PATENT DOCUMENTS

| | | | | |
|---|---|---|---|---|
| 2010/0108007 | A1* | 5/2010 | Meistrick | F01L 13/065 123/90.46 |
| 2015/0122220 | A1 | 5/2015 | Cecur | |

(Continued)

FOREIGN PATENT DOCUMENTS

| | | | |
|---|---|---|---|
| DE | 102010011455 | A1 | 9/2011 |
| DE | 102018105359 | A1 | 9/2019 |

(Continued)

OTHER PUBLICATIONS

International search report and Written Opinion received for PCT Application No. PCT/EP2024/025023, 13 pages.

*Primary Examiner* — Loren C Edwards

(74) *Attorney, Agent, or Firm* — Meunier Carlin & Curfman LLC

(57) ABSTRACT

In one embodiment, an engine brake capsule for use in a rocker arm is provided. The engine brake capsule includes a housing comprising a first chamber and a second chamber, an actuation pin assembly housed in the first chamber, a check ball assembly housed in the second chamber, a plunger pad comprising a channel extending through the plunger pad, and a latching assembly coupled to the plunger pad through the channel of the plunger pad. In particular, the plunger pad is at least partially housed in the second chamber and configured to be movable relative to the second chamber. The latching assembly is configured to be movable between a latched position to lock the plunger pad relative to the second chamber and an unlatched position to unlock the plunger pad from the second chamber.

20 Claims, 5 Drawing Sheets

Related U.S. Application Data

(60) Provisional application No. 63/480,586, filed on Jan. 19, 2023.

(51) Int. Cl.
*F01L 13/00* (2006.01)
*F01L 13/06* (2006.01)

(56) References Cited

U.S. PATENT DOCUMENTS

| | | | | |
|---|---|---|---|---|
| 2018/0045084 | A1* | 2/2018 | Yankovic | F01L 1/2405 |
| 2020/0291829 | A1* | 9/2020 | Altherr | F01L 13/0036 |

FOREIGN PATENT DOCUMENTS

| | | | |
|---|---|---|---|
| WO | WO 2020104057 | A1 | 5/2020 |
| WO | WO 2021226636 | A1 | 11/2021 |
| WO | WO 2022228732 | A1 | 11/2022 |

* cited by examiner

ENGINE BRAKE CAPSULE WITH PLUNGER PAD

CROSS REFERENCE TO RELATED APPLICATION

This application claims the benefit under 35 U.S.C. § 365(c) of International Patent Application No. PCT/EP2024/025023, filed 12 Jan. 2024, which claims the benefit under 35 U.S.C. § 119(e) of U.S. Provisional Patent Application No. 63/480,586 filed 19 Jan. 2023, which is incorporated by reference herein in its entirety.

TECHNICAL FIELD

This disclosure relates generally to a valve train system, and more particularly to an engine brake capsule with a plunger pad.

BACKGROUND

Internal combustion engines typically use valve train systems to actuate engine valves. For example, these systems may include a combination of cams, shafts, rocker arms, and various motion-conveying mechanisms that may be driven by the engine's crankshaft rotation, selectively conveying actuation motion to the downstream valves.

SUMMARY OF PARTICULAR EMBODIMENTS

This disclosure presents in general a valve train system configured with an engine brake capsule for achieving engine braking functionality. By constructing the engine brake capsule with a plunger pad according to this disclosure, it may provide a number of benefits including but not limited to simplified structure, reduced manufacturing cost, prolonged service life, and improved dynamic behavior of the system, just to name a few.

In one embodiment, an engine brake capsule for use in a rocker arm is provided. The engine brake capsule includes a housing comprising a first chamber and a second chamber, an actuation pin assembly housed in the first chamber, a check ball assembly housed in the second chamber, a plunger pad comprising a channel extending through the plunger pad, and a latching assembly coupled to the plunger pad through the channel of the plunger pad. In particular, the plunger pad is at least partially housed in the second chamber and configured to be movable relative to the second chamber. Moreover, the latching assembly is configured to be movable between a latched position to lock the plunger pad relative to the second chamber and an unlatched position to unlock the plunger pad from the second chamber.

In particular embodiments, the latching assembly comprises a spring and one or more balls. In particular embodiments, the spring is configured to apply force on the one or more balls. In particular embodiments, the channel is configured to allow the spring and the one or more balls to move along a direction parallel to an axis of the channel. In particular embodiments, the second chamber comprises one or more grooves to engage with the latching assembly through the one or more balls. In particular embodiments, the grooves are configured to fit the shapes of the one or more balls. In particular embodiments, the spring and at least a portion of the one or more balls are within the channel. In particular embodiments, the spring is configured to extend or retract within the channel while applying the force on the one or more balls.

In particular embodiments, the channel is oriented substantially perpendicular to a moving direction of the plunger pad.

In particular embodiments, the plunger pad is configured to be movable between a retracted position and an extended position. In particular embodiments, the latching assembly is configured to lock the plunger pad relative to the second chamber when the plunger pad is in the retracted position. In particular embodiments, the latching assembly is configured to unlock the plunger pad from the second chamber when the plunger pad is in the extended position.

In particular embodiments, the plunger pad is configured to be movable relative to the second chamber based on positions of the actuation pin assembly and the check ball assembly.

In one embodiment, a valve train assembly is provided. The valve train assembly includes a rocker arm having a cam end configured to be in proximity to a cam and a valve end opposite from the cam end and configured to be in proximity to a valve bridge, and an engine brake capsule at least partially embedded in the valve end of the rocker arm. The engine brake capsule includes a housing comprising a first chamber and a second chamber, an actuation pin assembly housed in the first chamber, a check ball assembly housed in the second chamber, a plunger pad comprising a channel extending through the plunger pad, and a latching assembly coupled to the plunger pad through the channel of the plunger pad. In particular, the plunger pad is at least partially housed in the second chamber and configured to be movable relative to the second chamber. Moreover, the latching assembly is configured to be movable between a latched position to lock the plunger pad relative to the second chamber and an unlatched position to unlock the plunger pad from the second chamber. Furthermore, in the latched position of the latching assembly, the plunger pad is configured to be at a predetermined distance from a sliding pin of the valve bridge.

In particular embodiments, the latching assembly comprises a spring and one or more balls. In particular embodiments, the spring is configured to apply force on the one or more balls. In particular embodiments, the channel is configured to allow the spring and the one or more balls to move along a direction parallel to an axis of the channel. In particular embodiments, the second chamber comprises one or more grooves to engage with the latching assembly through the one or more balls. In particular embodiments, the grooves are configured to fit the shapes of the one or more balls. In particular embodiments, the spring and at least a portion of the one or more balls are within the channel. In particular embodiments, the spring is configured to extend or retract within the channel while applying the force on the one or more balls.

In particular embodiments, the channel is oriented substantially perpendicular to a moving direction of the plunger pad.

In particular embodiments, the plunger pad is configured to be movable between a retracted position and an extended position. In particular embodiments, the latching assembly is configured to lock the plunger pad relative to the second chamber when the plunger pad is in the retracted position. In particular embodiments, the latching assembly is configured to unlock the plunger pad from the second chamber when the plunger pad is in the extended position.

In particular embodiments, the plunger pad is configured to be movable relative to the second chamber based on positions of the actuation pin assembly and the check ball assembly.

BRIEF DESCRIPTION OF THE DRAWINGS

Embodiments in accordance with this disclosure will now be described by reference to the accompanying drawings, in which.

DESCRIPTION OF EXAMPLE EMBODIMENTS

Reference will now be made in detail to the examples which are illustrated in the accompanying drawings. Wherever possible, the same reference numbers will be used throughout the drawings to refer to the same or like parts. Directional references such as "up", "down", "right", and "left" are for ease of reference to the figures and not intended to limit the scope of this disclosure.

The embodiments disclosed herein present an improved solution for engine braking, such as compression release engine braking. For example, for being able to brake with the engine, compressed air at the end of a compression stroke of an engine cylinder may be released to exhaust, such that the engine basically functions as an air compressor and thus consumes energy, causing the vehicle to brake. Typically, an engine brake capsule is often employed by the rocker arm for such purposes. For example, the engine brake capsule may be configured with a plunger pad that is selectively translatable between a retracted and extended position, the retracted position disabling actuation of a valve in the cylinder by the rocker arm and the extended position enabling actuation of the valve. There is a need to provide a solution to control movement of the plunger pad to avoid undesired impact to various components of the engine brake capsule.

Figure 1:
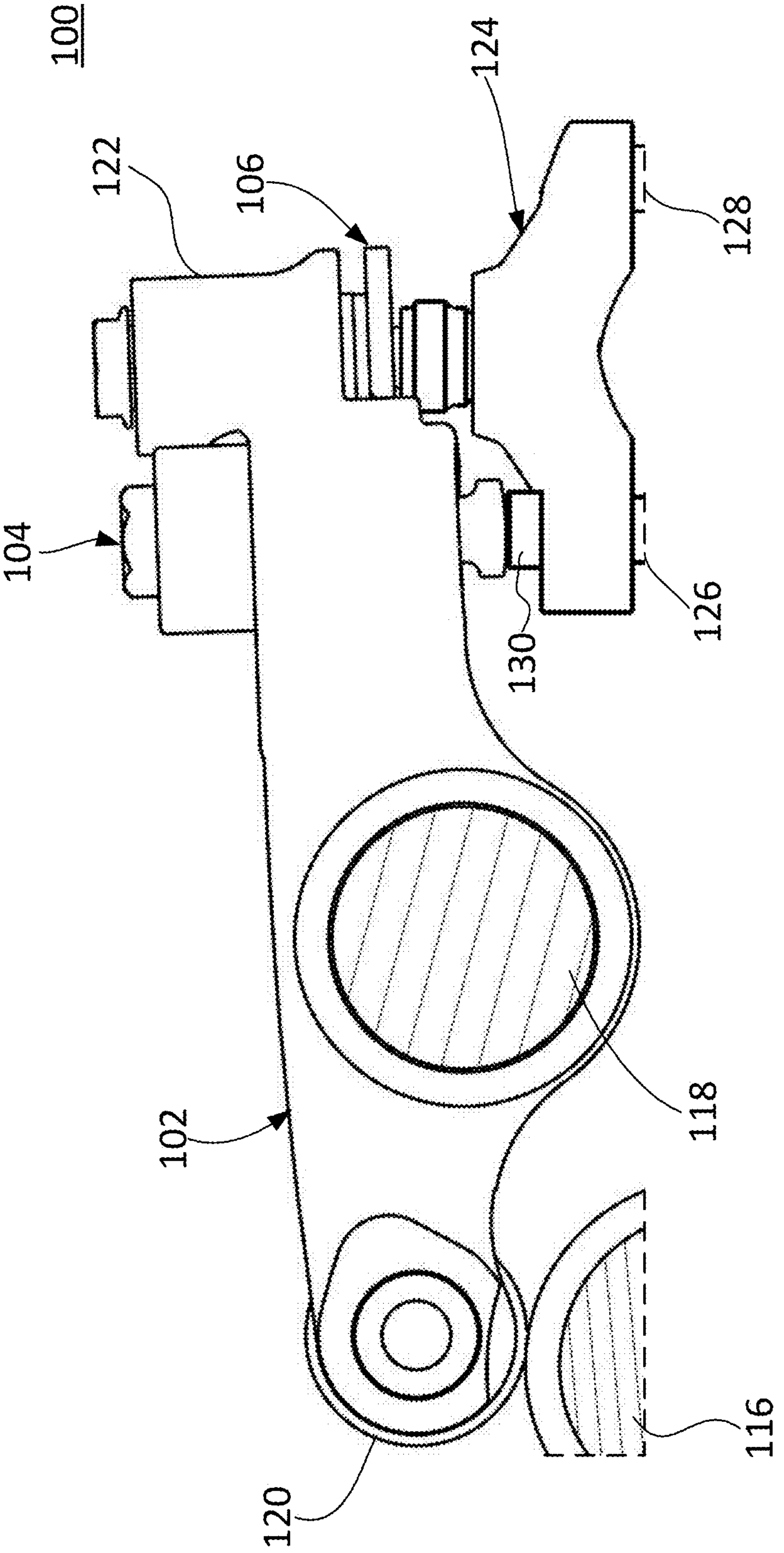
FIG. 1 illustrates an example valve train assembly according to one embodiment of this disclosure.

FIG. 1 illustrates an example valve train assembly 100 according to one embodiment of this disclosure. In practice, a pair of valve train assemblies similar to the valve train assembly 100 may be provided for each cylinder engine for performing intake and exhaust functions, respectively. However, for the sake of simplicity and by way of example only, particular embodiments of this disclosure may be described by referencing one valve train assembly 100 that is, for example, associated with the exhaust side of the engine.

In particular embodiments, the valve train assembly 100 may generally include a rocker arm 102. The rocker arm 102 may be pivotably supported by a rocker shaft (not shown) extending through an opening 118 of the rocker arm 102 such that the rocker arm 102 may rotate around the rocker shaft based on rotation of a cam 116 (partially shown). Specifically, in particular embodiments, a cam end 120 of the rocker arm 102 may contact or otherwise be coupled (e.g., either directly or indirectly via motion-conveying mechanisms) to the cam 116 for receiving valve actuation motion. A valve end 122 opposite the cam end 120 of the rocker arm 102 may be configured to be coupled to a valve bridge 124 to selectively transfer motion from the cam 116 to one or more engine valves (e.g., valves 126 and 128) coupled to the valve bridge 124.

In particular embodiments, the rocker arm 102 may be a so-called integrated rocker arm having both engine braking and main exhaust functionalities combined in a single rocker arm body. For example, the rocker arm 102 may include an engine brake capsule 104 embedded within and integrated with the rocker arm 102 for performing engine braking and an elephant foot (E-foot) capsule 106 also integrated with the rocker arm 102 for main exhaust operation. For example, the engine brake capsule 104 may be configured to act on one of the engine valves, i.e., valve 126 as depicted, via a portion of the valve bridge 124 such as a sliding pin 130 or other suitable parts. The E-foot capsule 106 may be configured to actuate both of the valves 126, 128 by acting on the center of the valve bridge 124. Alternatively, in other embodiments, the rocker arm may be a dedicated rocker arm having an engine brake capsule similar to the engine brake capsule 104 for performing engine braking. In this case, for example, another exhaust rocker arm may be provided for separately performing the main exhaust event. While described in this particular manner, it should be appreciated that various embodiments disclosed herein may also be applicable in any suitable rocker arm configurations in any suitable manner.

It may be desirable to configure the engine brake capsule 104 to be switchable such that one can choose whether to activate engine brake functionality or not. That is, the engine brake capsule 104 may transfer between the drive mode (e.g., the engine brake capsule 104 does not apply force to the sliding pin 130, which connects with the valve 126 associated with engine braking, thus the associated valve 126 remains unactuated by engine brake lift regardless of rotation of the rocker arm 102) and the engine brake mode (e.g., the engine brake capsule 104 engages sliding pin 130, as the rocker arm 102 rotates, allowing brake motion to be delivered to the valve 126 associated with engine braking). To this end, in particular embodiments, the engine brake capsule 104 may configured to move between a retracted position and an extended position. As an example and not by way of limitation, the engine brake capsule 104 may be controlled hydraulicly by pressurized fluid supplied via a fluid circuit running through the rocker arm 102. In other examples and not by way of limitation, the engine brake capsule 104 may be controlled mechanically, electrically, hydro-mechanically, or in any suitable manner to move between the retracted position and the extended position. In particular embodiments, the engine brake capsule 104 may be received by a vertical bore arranged in the valve end 122 of the rocker arm 102. During operation, portions of the engine brake capsule 104 may be actuated on demand to either protrude down from the bottom of the valve end 122 or retract up toward the valve end 122, details of which will be further described below.

Figure 2:
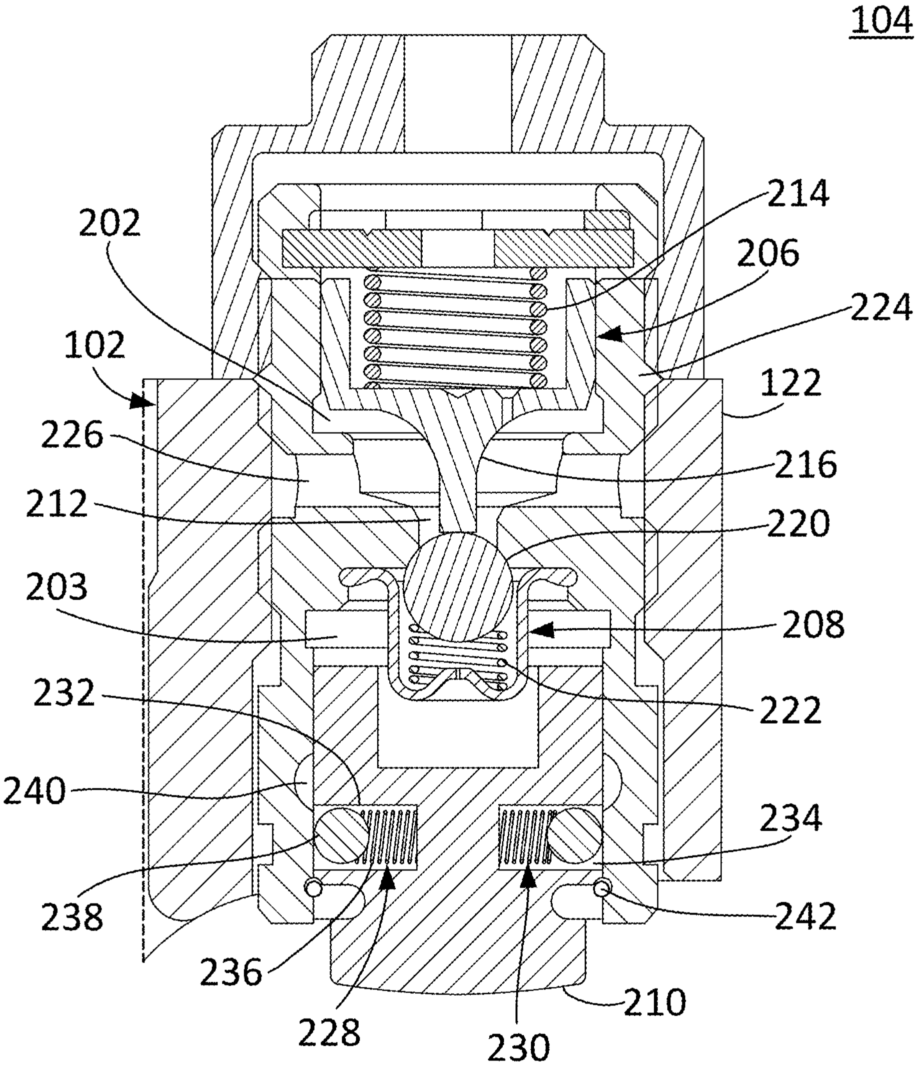
FIG. 2 illustrates a cross-sectional view of an engine brake capsule according to one embodiment of this disclosure.

FIG. 2 illustrates a cross-sectional view of the engine brake capsule 104, specifically showing its extended state. In particular embodiments, the engine brake capsule 104 may include a housing 224, which may be divided into a first chamber and a second chamber such as an upper chamber 202 and a lower chamber 203 for respectively accommodating components of the engine brake capsule 104. As depicted, the upper chamber 202 may house an actuation pin assembly 206. The lower chamber 203 may house a check valve assembly 208 and a plunger pad 210. By containing various capsule components in a single housing, it may streamline the capsule design, allow easier lash adjustment, and facilitate maintenance, repair, and replacement.

In particular embodiments, the upper chamber 202 may be ported with one or more fluid channels 226. For example, the fluid channel(s) 226 may be arranged circumferentially on a side wall of the upper chamber 202 and configured to receive hydraulic fluid (e.g., oil) with a high pressure that may, for example, be supplied from a fluid control valve to the rocker arm 102. The lower chamber 203 may be positioned below the upper chamber 202 and configured to be in fluid communication with the upper chamber 202 via an opening 212 disposed therebetween. In this way, pressurized fluid introduced into the upper chamber 202 may be allowed to enter via the opening 212 to the lower chamber 203—for example, in a selective way under the control of the check valve assembly 208, details of which will be more clearly explained below.

In particular embodiments, the upper chamber 202 may house the actuation pin assembly 206. The actuation pin assembly 206 may be hydraulicly controlled by fluid pressure introduced in the upper chamber 202 to compress and/or extend vertically. As an example, in the configuration as depicted, a spring 214 may be coupled to an upper end of a pin 216 and configured to bias down the pin 216 to its extended position. As fluid flows in and hydraulic pressure builds up inside the upper chamber 202, the hydraulic force acting on the pin 216 may overcome the downward biasing force applied by the spring 214, consequently pushing the pin 216 in an upward direction into retraction.

In particular embodiments, the check valve assembly 208 located downstream of the actuation pin assembly 206 may be configured to selectively enable fluid communication between the upper chamber 202 and the lower chamber 203 based on the movement of the pin 216. The check valve assembly 208 may be arranged in the lower chamber 203 in a position that is directly below the opening 212. In the embodiment as shown, the check valve assembly 208 comprises a check ball 220, which may be pressed down by the pin 216 in order to open fluid passage through the opening 212. During operation, the check ball 220 may normally press against the opening 212, e.g., by means of a valve spring 222 pushing the check ball 220 upwards. Essentially, in this configuration, the check ball 220 may function as a one-way valve or a non-return valve that allows fluid to flow downwards to the lower chamber 203 but prevents it from flowing back in the opposite direction to the upper chamber 202. When the pin 216 moves to its extended position, a lower end of the pin 216 may push against the check ball 220, thereby unseating the check ball 220 from the opening 212 and allowing fluid to flow past the check ball 220 into the lower chamber 203, or vice versa.

In particular embodiments, the lower chamber 203 may further house the plunger pad 210. For example, the plunger pad 210 may be disposed below and in line with the check valve assembly 208. Specifically, the plunger pad 210 may be configured to vertically translate a certain distance in the lower chamber 203 between an extended position and a retracted position upon actuation by the fluid introduced into the lower chamber 203. Explaining further, when the lower chamber 203 is filled with pressurized fluid, the plunger pad 210 may be hydraulicly actuated in a downward direction to such a position where a lower end of the plunger pad 210 may extend out from the bottom of the valve end 122, such as the position shown in FIG. 2. For example, a stopper 242 such as a clip, an O-ring, or the like may be configured near the bottom of the lower chamber 203 to prevent the plunger pad 210 from falling out. When extended, the plunger pad 210 is allowed to make contact with a portion of the valve bridge 124 as the rocker arm 102 rotates, thus enabling motion transmission from the cam 116 to the valve 126 for engine braking. When fluid pressure is removed from the lower chamber 203, the plunger pad 210 may be allowed to retract into the lower chamber 203 and space from contacting the valve bridge 124 (e.g., by a predetermined distance), thus avoiding conveying motion to the valve 126. In other words, by configuring the engine brake capsule 104 in this manner, a variable volume may be formed, which expands when the pressurized fluid reaches the lower chamber 203 through the check valve assembly 208, pushing the plunger pad 210 downward, and compresses when the check valve assembly 208 opens, releasing fluid from the lower chamber 203, in order to enable or disable engine brake functionality on command.

In particular embodiments, the plunger pad 210 may be configured with one or more latching assemblies to latch or unlatch the plunger pad 210 relative to the lower chamber 203. For example, in the embodiment of FIG. 2, the plunger pad 210 may include two latching assemblies 228, 230, which may respectively be provided in two channels 232, 234 near a lower portion of the plunger pad 210. The channels 232, 234 may be oriented substantially perpendicular to a moving direction of the plunger pad 210 and may be configured to allow the latching assemblies 228, 230 to move along a direction parallel to an axis of the channel. As an example and not by way of limitation, the latching assemblies 228, 230 may have the same or similar configurations. For the sake of simplicity, the following will be described by referencing the latching assembly 228 shown on the left of FIG. 2.

In particular embodiments, the latching assembly 228 may include a spring 236 and a ball 238. One end of the spring 236 may be coupled to or received by the channel 232 of the plunger pad 210, while the other end of the spring 236 may be attached to the ball 238. In particular embodiments, the inner wall of the lower chamber 203 may be structured with one or more grooves 240 to engage with the ball 238. The one or more grooves 240 may be configured to fit the shape of the ball 238. For example, when the plunger pad 210 is in the retracted position, the spring 236 may bias the ball 238 outward (e.g., horizontally) to at least partially engage with the groove 240. This way, the plunger pad 210 may be locked in its retracted position and prevented from moving up and down relative to the lower chamber 203, thereby reducing wear and collision of the plunger pad 210, the stopper 242, the valve bridge 124, or other components in the valve train system. As fluid flows into the lower chamber 203, hydraulic pressure may press down on the plunger pad 210, overcoming the biasing force of the spring 236, and pushing the ball 238 inward and out of engagement with the groove 240. This way, the plunger pad 210 is unlocked and allowed to extend downward to actuate the engine brake.

Although this disclosure describes an engine brake capsule with a particular plunger pad having a particular latching assembly in a particular manner, this disclosure contemplates engine brake capsules with plunger pads having any suitable latching assemblies in any suitable manner. As an example, the latching assembly may include other latch members in addition or alternative to the ball, such as a pin, a block, a tab, or the like may be provided for achieving the desired function of this disclosure.

An example switching process of the engine brake capsule 104 may be described with continued reference to FIG. 2. During the drive mode of the valvetrain system, the engine brake capsule 104 may be deactivated and remain in its default retracted position where the lower end of the plunger pad 210 retracts into the valve end 122 of the rocker arm 102. For example, in particular embodiments, the latching assemblies 228, 230 may be configured to lock the plunger pad 210 in the retracted state such that any contact between the plunger pad 210 and the sliding pin 130 is prevented when the engine brake mode is off. This may avoid wearing of the components that would otherwise occur due to unintended contact.

When the engine brake functionality is demanded, the engine brake capsule 104 may be activated to its extended state. For example, this may be done hydraulicly, mechanically, electrically, or in other suitable manners. In particular embodiments where hydraulic control is employed, pressurized fluid may enter the upper chamber 202, compressing the spring 214 and pushing the pin 216 upward. Fluid pressure built up in the upper chamber 202 may further push down the check ball 220 of the check valve assembly 208, thus unblocking the opening 212 to allow fluid to enter through the check valve assembly 208 to the lower chamber 203. As the lower chamber 203 is filled with fluid, the latching assemblies 228, 230 may yield, unlocking the plunger pad 210 from the lower chamber 203 to allow movement of the plunger pad 210 relative to the lower chamber 203. The plunger pad 210 may be hydraulicly actuated in the downward direction to its extended position where the lower end of the plunger pad 210 protrudes out from the bottom of the valve end 122 of the rocker arm 102.

Afterward, the check valve assembly 208 may be closed and the pressurized fluid may be trapped inside the lower chamber 203 by virtue of the non-return characteristic of the check valve assembly 208 that prevents fluid from flowing back upward. At the same time, the pin 216 may stay retracted and avoid pressing the check ball 220 to guarantee that the check ball 220 remains in its closed position against the opening 212 so that fluid pressure inside the lower chamber 203 is maintained. In this way, when the rocker arm 102 rotates, the extended plunger pad 210 may engage the sliding pin 130, which connects with the valve 126, thus actuating the valve 126 to perform engine braking.

When switching back to drive mode or non-brake mode, the system may be depressurized such that the fluid inside the upper chamber 202 may escape, e.g., from the fluid channel 226. Since the hydraulic pressure is no longer present in the upper chamber 202, the pin 216 may return to its extended position under the downward biasing force applied by the spring 214. In this case, the pin 216 may push down the check ball 220, thus opening the check valve assembly 208. Once opened, the fluid that is previously trapped inside the lower chamber 203 may be released out through the opening 212. As such, since the hydraulic force is removed, the plunger pad 210 is allowed to retract. For example, the latching assembly 228 may latch to the groove 240, thus keeping the plunger pad 210 retracted and refrained from pressing or contacting the sliding pin 130.

Figure 3:
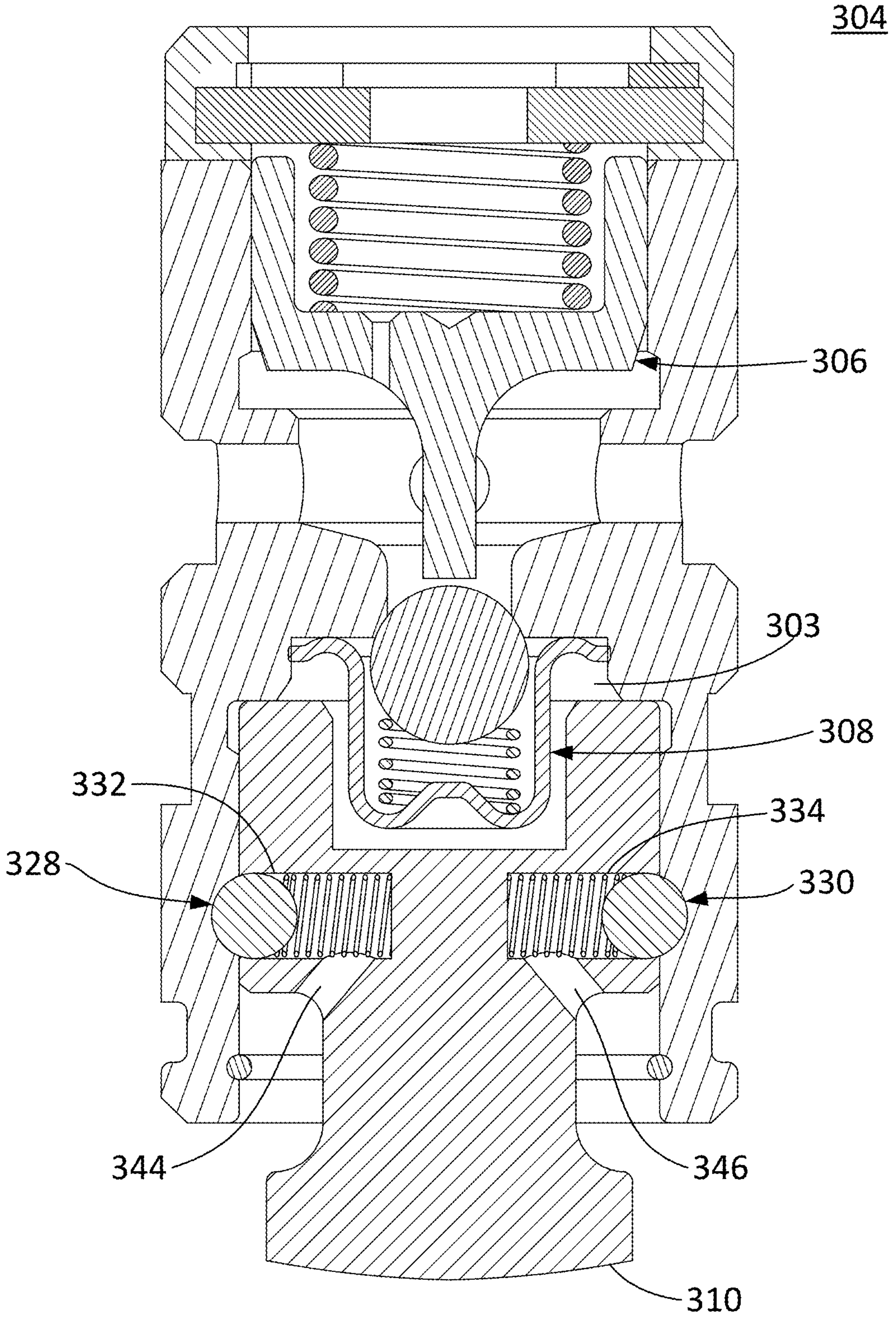
FIG. 3 illustrates a cross-sectional view of an engine brake capsule according to another embodiment of this disclosure.

FIG. 3 illustrates another embodiment of an engine brake capsule 304 according to this disclosure, which is shown as retracted. The engine brake capsule 304 may generally be similar to the engine brake capsule 104 described above. For example, in particular embodiments, the engine brake capsule 304 may generally include an actuation pin assembly 306, a check valve assembly 308, and a plunger pad 310. As an example and not by way of limitation, the plunger pad 310 may include two latching assemblies 328, 330, which may be received in two channels 332, 334 respectively. The two latching assemblies 328, 330 may be configured to latch or unlatch the plunger pad 310 relative to the lower chamber 303.

In particular embodiments, two holes 344, 346 may be ported to the channels 332, 334. For example, the holes 344, 346 may be used to drain any residual fluid from the channels 332, 334 that may otherwise resist compression of the latching assemblies 328, 330.

Figure 4:
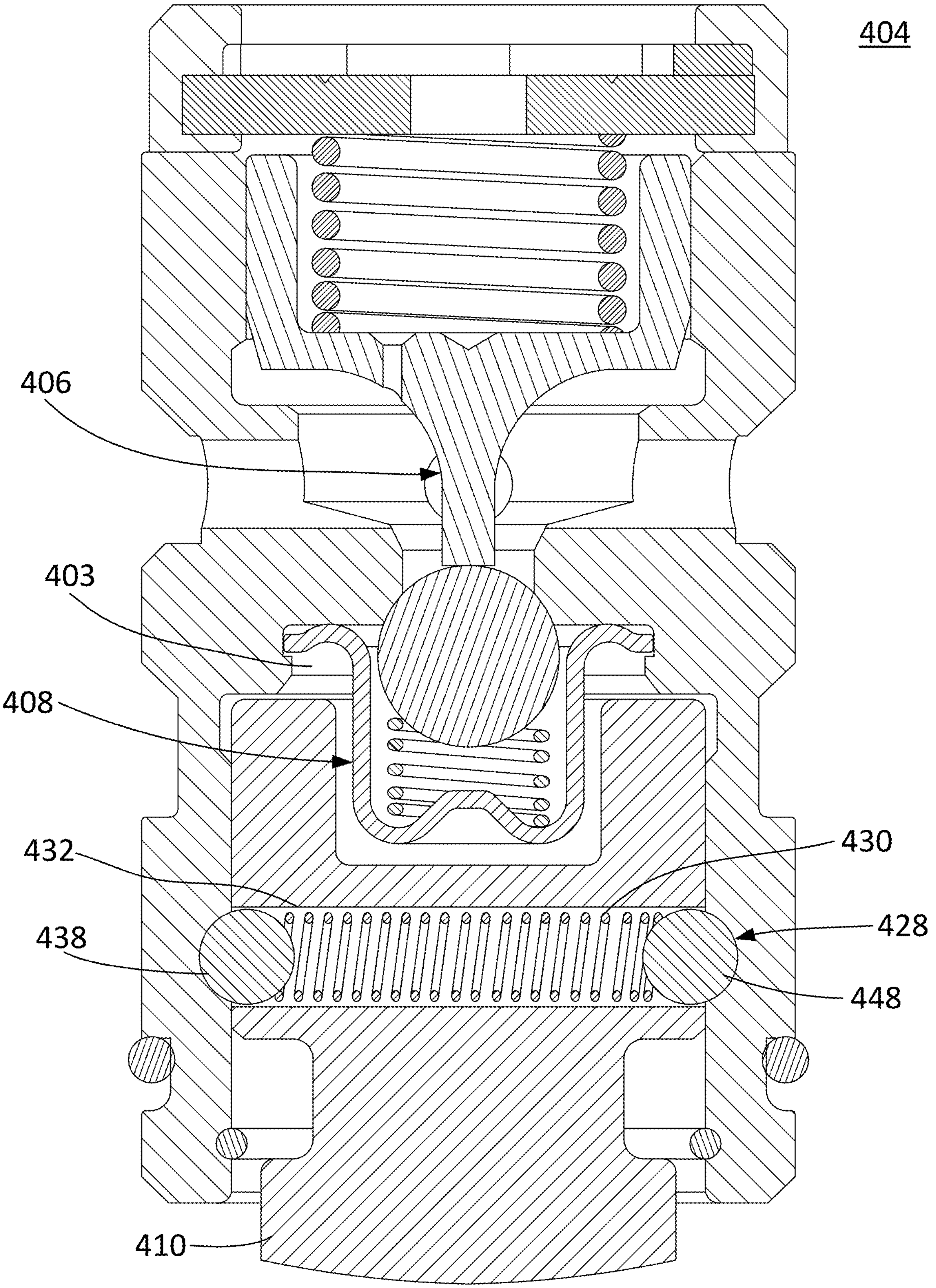
FIGS. 4-5 illustrate cross-sectional views of an engine brake capsule according to a further embodiment of this disclosure.
Figure 5:
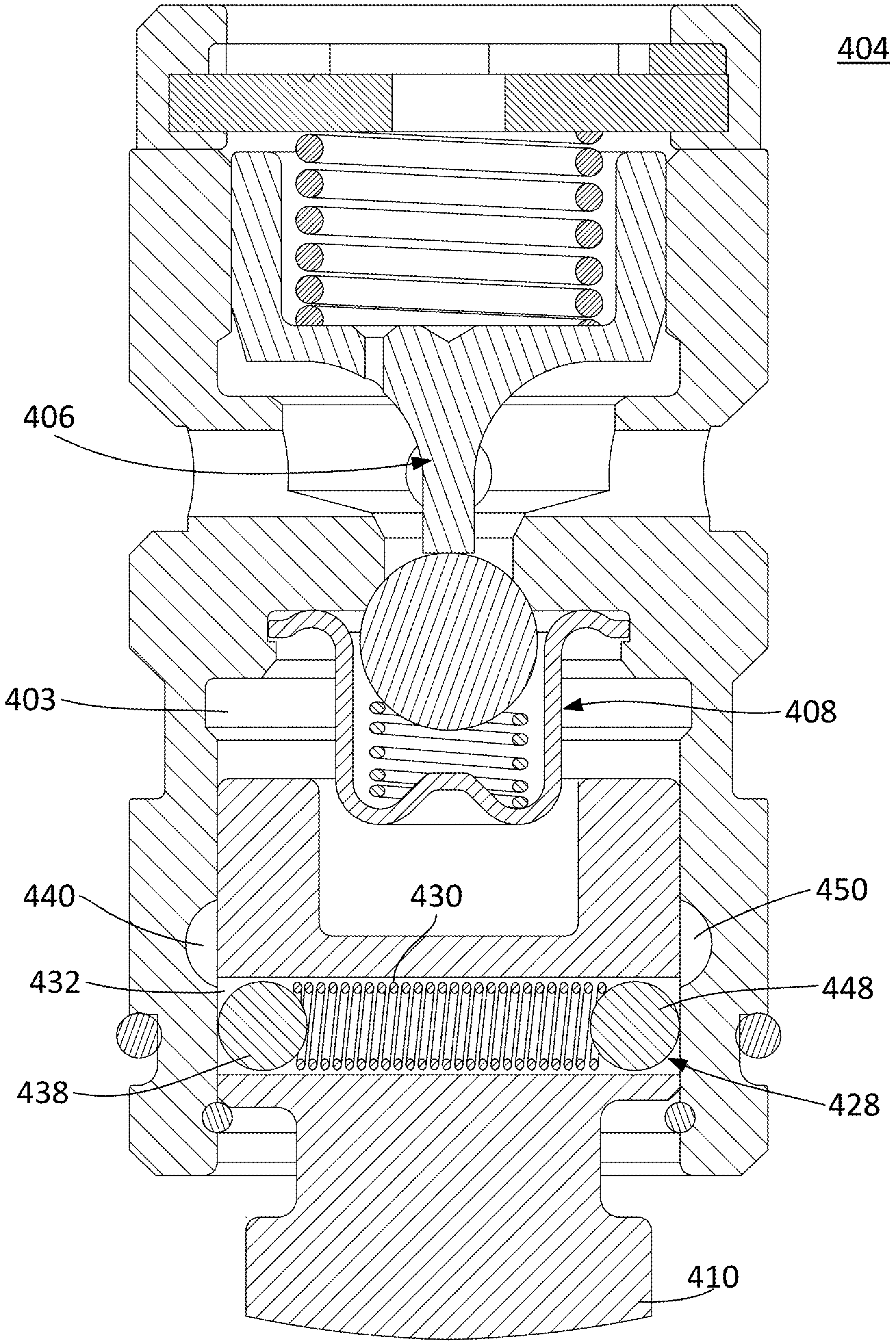

FIGS. 4-5 illustrate a further embodiment of an engine brake capsule 404 according to this disclosure, in which FIG. 4 depicts the engine brake capsule 404 in drive mode (e.g., during main exhaust operation), and FIG. 5 depicts the engine brake capsule 404 in engine brake mode. The engine brake capsule 404 may generally be similar to the engine brake capsule 104 described above. For example, in particular embodiments, the engine brake capsule 404 may generally include an actuation pin assembly 406, a check valve assembly 408, and a plunger pad 410. In particular embodiment, the plunger pad 410 may include one latching assembly 428, which may be received in a channel 432 extending through a lower portion of the plunger pad 410. As an example and not by way of limitation, the latching assembly 428 may include a first ball 438, a second ball 448, and a spring 430 connecting between the first and second balls 438, 448. As an example and not by way of limitation, the channel 432 may be oriented substantially perpendicular to a moving direction of the plunger pad 410 and may be configured to allow components of the latching assembly 428 (e.g., the two balls 438, 448, and the spring 430) to move along a direction parallel to an axis of the channel 432. By providing the plunger pad 410 with one channel 432, it may simplify the manufacturing process and reduce production cost. For example, the channel 432 may be manufactured by a single drill through the plunger pad 410, or other suitable methods. Moreover, the number of springs required for the latching assembly may be reduced, lowering the cost further.

In particular embodiments, the inner wall of the lower chamber 403 may be structured with one or more grooves such as grooves 440, 450 to engage with the balls 438, 448. The grooves 440, 450 may be configured to fit the shapes of the balls 438, 448. For example, when the plunger pad 210 is in the retracted position, the spring 430 may bias the balls 438, 448 outward to at least partially engage with the grooves 440, 450. This way, the plunger pad 410 may be kept retracted and prevented from moving up and down relative to the lower chamber 403, thereby reducing wear and collision of various fragile components in the valve train system. As hydraulic pressure builds up in the lower chamber 403 and acts down on the plunger pad 410, the balls 438, 448 may be pushed out of engagement with the grooves 440, 450 (e.g., in a direction inward into the channel 432, compressing the spring 430), thus allowing the plunger pad 410 to extend downward to actuate the engine brake. Therefore, in particular embodiments, the spring 430 of the latching assembly 428 may be designed with a particular spring force or stiffness that is sufficiently large to push the balls 438, 448 into the grooves 440, 450, thereby preventing movement of the plunger pad 410 during drive mode operation, yet small enough to yield under the high hydraulic pressure supplied to the lower chamber 403 to allow movement of the plunger pad 410 for engine braking.

Although this disclosure describes an engine brake capsule with a particular plunger pad having a particular latching assembly in a particular manner, this disclosure contemplates engine brake capsules with plunger pads having any suitable latching assemblies in any suitable manner. As an example, other latch members in addition or alternative to the ball may be provided, such as a pin, a block, a tab, or the like may be provided for achieving the desired function of this disclosure.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An engine brake capsule for use in a rocker arm, the engine brake capsule comprising:

a housing comprising a first chamber and a second chamber;

an actuation pin assembly housed in the first chamber;

a check ball assembly housed in the second chamber;

a plunger pad comprising a channel extending through the plunger pad, wherein the plunger pad is at least partially housed in the second chamber and configured to be movable relative to the second chamber; and a latching assembly coupled to the plunger pad through the channel of the plunger pad and configured to be movable between a latched position to lock the plunger pad relative to the second chamber and an unlatched position to unlock the plunger pad from the second chamber, wherein the latching assembly comprises a spring and one or more balls, wherein the spring is configured to apply force on the one or more balls, wherein the spring and at least a portion of the one or more balls are within the channel, and wherein the spring is configured to extend or retract within the channel while applying the force on the one or more balls.

2. The engine brake capsule of claim 1, wherein the spring of the latching assembly is a first spring configured to apply force on a first ball, the latching assembly further comprising a second spring configured to apply force on a second ball.

3. The engine brake capsule of claim 2, wherein the first spring is disposed within a first channel and the second spring is disposed within a second channel.

4. The engine brake capsule of claim 1, wherein the channel is configured to allow the spring and the one or more balls to move along a direction parallel to an axis of the channel.

5. The engine brake capsule of claim 1, wherein the second chamber comprises one or more grooves to engage with the latching assembly through the one or more balls, and wherein the one or more grooves are configured to fit shapes of the one or more balls.

6. The engine brake capsule of claim 1, wherein the channel is oriented substantially perpendicular to a moving direction of the plunger pad.

7. The engine brake capsule of claim 1, wherein the plunger pad is configured to be movable between a retracted position and an extended position.

8. The engine brake capsule of claim 7, wherein the latching assembly is configured to lock the plunger pad relative to the second chamber when the plunger pad is in the retracted position.

9. The engine brake capsule of claim 7, wherein the latching assembly is configured to unlock the plunger pad from the second chamber when the plunger pad is in the extended position.

10. The engine brake capsule of claim 1, wherein the plunger pad is configured to be movable relative to the second chamber based on positions of the actuation pin assembly and the check ball assembly.

11. A valve train assembly, comprising:

a rocker arm having a cam end configured to be in proximity to a cam and a valve end opposite from the cam end and configured to be in proximity to a valve bridge; and an engine brake capsule at least partially embedded in the valve end of the rocker arm, the engine brake capsule comprising a housing comprising a first chamber and a second chamber, an actuation pin assembly housed in the first chamber, a check ball assembly housed in the second chamber, a plunger pad comprising a channel extending through the plunger pad, wherein the plunger pad is at least partially housed in the second chamber and configured to be movable relative to the second chamber, and a latching assembly coupled to the plunger pad through the channel of the plunger pad and configured to be movable between a latched position to lock the plunger pad relative to the second chamber and an unlatched position to unlock the plunger pad from the second chamber, wherein in the latched position of the latching assembly, the plunger pad is configured to be at a predetermined distance from a sliding pin of the valve bridge, wherein the latching assembly comprises a spring and one or more balls, wherein the spring is configured to apply force on the one or more balls, wherein the spring and at least a portion of the one or more balls are within the channel, and wherein the spring is configured to extend or retract within the channel while applying the force on the one or more balls.

12. The valve train assembly of claim 11, wherein the spring of the latching assembly is a first spring configured to apply force on a first ball, the latching assembly further comprising a second spring configured to apply force on a second ball.

13. The valve train assembly of claim 12, wherein the first spring is disposed within a first channel and the second spring is disposed within a second channel.

14. The valve train assembly of claim 11, wherein the channel is configured to allow the spring and the one or more balls to move along a direction parallel to an axis of the channel.

15. The valve train assembly of claim 11, wherein the second chamber comprises one or more grooves to engage with the latching assembly through the one or more balls, and wherein the one or more grooves are configured to fit shapes of the one or more balls.

16. The valve train assembly of claim 11, wherein the channel is oriented substantially perpendicular to a moving direction of the plunger pad.

17. The valve train assembly of claim 11, wherein the plunger pad is configured to be movable between a retracted position and an extended position.

18. The valve train assembly of claim 17, wherein the latching assembly is configured to lock the plunger pad relative to the second chamber when the plunger pad is in the retracted position.

19. The valve train assembly of claim 17, wherein the latching assembly is configured to unlock the plunger pad from the second chamber when the plunger pad is in the extended position.

20. The valve train assembly of claim 11, wherein the plunger pad is configured to be movable relative to the second chamber based on positions of the actuation pin assembly and the check ball assembly.

* * * * *